United States Patent
Brunner et al.

(10) Patent No.: US 7,064,302 B2
(45) Date of Patent: Jun. 20, 2006

(54) ELECTRICAL CONNECTION FOR A RESISTOR ELEMENT MADE OF ELECTRICALLY-CONDUCTIVE FIBERS

(75) Inventors: Daniel Brunner, Soisy-sous-Montmorency (FR); André Amari, Marly la Ville (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 11/066,486

(22) Filed: Feb. 28, 2005

(65) Prior Publication Data

US 2005/0194376 A1    Sep. 8, 2005

(30) Foreign Application Priority Data

Feb. 27, 2004    (FR) .................................. 04 01985

(51) Int. Cl.
*H05B 3/08*    (2006.01)
(52) U.S. Cl. ...................... 219/541; 219/529; 219/543; 219/545; 214/134 D; 214/134 R; 338/208; 338/210; 338/259
(58) Field of Classification Search ................ 219/541, 219/529, 543, 545; 214/134 D, 134 R; 338/208, 338/210, 259

See application file for complete search history.

(56) References Cited

U.S. PATENT DOCUMENTS

| | | | |
|---|---|---|---|
| 2,884,509 A | | 4/1959 | Heath |
| 5,925,275 A | * | 7/1999 | Lawson et al. .............. 219/543 |
| 5,947,418 A | * | 9/1999 | Bessiere et al. ........ 244/134 D |

FOREIGN PATENT DOCUMENTS

| FR | 2719182 | 10/1995 |
|---|---|---|
| GB | 881544 | 11/1961 |

\* cited by examiner

*Primary Examiner*—Shawntina Fuqua
(74) *Attorney, Agent, or Firm*—Young & Thompson

(57) ABSTRACT

A connection endpiece placed on a resistor element provided with at least one layer of electrically-conductive fibers, the endpiece serving to connect a power supply wire electrically to the resistor element. The endpiece includes at least one metal plate having a top face for connection to the power supply wire, and provided with at least one rigid metal connector member of substantially flat shape arranged at a first end of the metal plate and connected to at least one layer of electrically-conductive fibers of the resistor element, the top face of the metal plate being covered in a removable anti-adhesive covering.

20 Claims, 1 Drawing Sheet

ELECTRICAL CONNECTION FOR A RESISTOR ELEMENT MADE OF ELECTRICALLY-CONDUCTIVE FIBERS

The present invention relates to an electrical connection device for a resistor element made of electrically-conductive fibers. This type of resistor element is used in particular for making heater mats of composite materials for de-icing aerodynamic surfaces of an aircraft.

BACKGROUND OF THE INVENTION

The problem of aerodynamic surfaces becoming iced is well known in the aviation industry. The term "icing" is used to designate more or less rapid formation of a deposit of ice on certain portions of an aircraft (leading edges of blades, propellers, wings, tail stabilizers and fins, windscreens, etc.). This ice forms in flight because an aerodynamic surface encounters droplets of water in the atmosphere that are supercooled. This supercooled state is a very precarious equilibrium state that can be broken by supplying a very small quantity of energy to the water droplet, e.g. in the form of a mechanical shock. The water then changes state and passes to the solid state. Thus, an airplane wing or a rotorcraft blade, for example, on passing through a zone of supercooled rain delivers enough energy to all of the water droplets it encounters for them to pass into the solid state. The aerodynamic surface then becomes covered in ice very quickly. This ice deposit weighs down the aircraft, sometimes to a very considerable extent, and also spoils the air flow by changing the shape of the aerodynamic surface, thus greatly degrades its performance.

This problem is often countered by fitting the aerodynamic surface with a heater mat, such a mat comprising a resistor element made of electrically-conductive fibers, e.g. carbon fibers, integrated in a composite substrate. When an electric current is passed therethrough, the Joule effect causes the resistor element to heat up the aerodynamic surface in which it is implanted so as to de-ice it or protect it against icing.

One of the difficult points with that technology lies with feeding the resistor element with electricity, and more particularly lies with the connection between at least one end of said resistor element and one or more electrical power supply wires coming from the aircraft.

Document FR 2 578 377 discloses the technique in present use, which consists in providing a deformable tubular sheath constituted by a metal knit. That tubular sheath serves to provide an electrical connection between a resistor element made of electrically-conductive fibers and an electrical power supply wire.

A first end of the tubular sheath is wound around the electrical power supply wire and is then soldered thereto. A second end thereof is then engaged around one end of the resistor element. The assembly as made in this way is then placed on a composite substrate and covered in one or more layers of fiberglass cloth in order to finish off draping the heater mat. The pressure applied during the operation of polymerizing the heater mat serves to anchor the metal knit of the tubular sheath in the electrically-conductive fibers of the resistor element.

Although that connection device gives satisfaction, it nevertheless presents characteristics that are poorly compatible with the requirements of industrial manufacturing.

Firstly, it requires the electrical power supply wire(s) to be connected to the resistor element at the time the heater mat is being made. When the heater mat is used for de-icing a blade of composite material for a rotorcraft, electrical power supply wires (often having a length that is greater than one meter) prevent the heater mat being installed on the blade while the blade is itself being molded. The electrical power supply wires are difficult to incorporate in the blade mold and they run the risk of leading to significant defects in molding.

Under such conditions, the present solution can be implemented only on an already-polymerized blade, during a specific bonding operation. The cycle time and manufacturing cost of the blade are then increased in penalizing manner.

Secondly, the high degree of flexibility and deformability of the tubular sheath lead to implementation difficulties, particularly for holding the assembly comprising the tubular sheath and the electrical power supply wire in position on the resistor element while the heater mat is being draped. Furthermore, the molding pressure exerted during polymerization of the heater mat can lead to misalignments and deformations of the electrical connections. These defects lead to poor quality electrical contact that can lead to abnormal levels of local heating.

Finally, the knitted structure of the tubular sheath leads to considerable electrical resistance in the longitudinal direction. This resistance thus greatly limits the magnitude of electric current that can be delivered to the resistor element. At the current levels required for good operation of the heater mat, this resistance can lead to excessive heating of the electrical connection zone.

A known variant of the prior art technique consists in soldering the electrical power supply wires not to an end of the tubular sheath but to the entire length thereof so as to allow a high current to pass. Nevertheless, that type of connection leads to considerable extra thickness in the electrical connection zone. Under such conditions, the aerodynamic surfaces need to be specially arranged inside the volume they define in order to be able to receive the device, and sometimes that can make it impossible to integrate the device on already-existing aerodynamic surfaces.

Furthermore, since the thickness of the connection needs to be minimized, it is necessary to spread out the strands of the electrical power supply wire(s) over the surface of the tubular sheath during tinplating. That operation is difficult and often leads to a surface that is not very uniform. Even when performed by experienced operators, manufacturing time is long and the final result is poorly reproducible, which naturally is not compatible with satisfactory industrialization of the device.

OBJECTS AND SUMMARY OF THE INVENTION

An object of the present invention is to overcome the above-described limitations so as to enable industrialization to be undertaken in good conditions.

According to the invention, a connection endpiece, placed on a resistor element provided with at least one layer of electrically-conductive fibers, serves to connect a power supply wire electrically to said resistor element. This endpiece is particularly remarkable in that it comprises at least one metal plate having a top face for connection to said power supply wire, and provided with at least one rigid metal connector member of substantially flat shape arranged at a first end of said metal plate and connected to at least one layer of electrically-conductive fibers of said resistor element.

In addition, the top face of the metal plate is covered in a removable anti-adhesive covering. While a heater mat is being made, this anti-adhesive covering protects the electrical connection zone, i.e. the top face of the metal plate, by preventing material, e.g. resin, from penetrating, and possibly also preventing said zone becoming polluted by an unmolding agent.

As described below, at the end of molding the heater mat, the anti-adhesive covering is removed, thereby uncovering the top face of the metal plate. This face is then quite clean, enabling high quality soldering of the electrical power supply wire on the top face of the plate.

Advantageously, the connection endpiece is disposed on an end of the resistor element that is to be electrically connected to a power supply wire. To do this, the connector member is in the form of a bushing that is engaged on the end of the resistor element.

In addition, the surface of the connector member in contact with the resistor element presents roughnesses or crevasses. Under molding pressure, these become engaged in the electrically-conductive fibers of the resistor element, thereby providing good electrical connection between the connector member and the resistor element.

In a first variant, the connector member is advantageously constituted by an expanded metal element.

In a second variant, the connector member is constituted by a punched metal sheet, and in a third variant, it is constituted by a woven metal fabric.

Finally, in a fourth variant, the connector member is obtained from a chemically-machined metal element.

In addition, the cost of the connection endpiece of the invention can be considerably reduced by basing manufacture thereof on-a single metal part. Under such conditions, a non-treated first zone of the metal part constitutes the metal plate. In addition, in order to constitute the connector member, a second zone is machined, e.g. chemically, so as to be provided with roughnesses or crevasses.

Contrary to a deformable tubular sheath, the use of a connector member that is substantially flat in shape presents numerous advantages.

Firstly, the continuity of the structure of said connector member implies low electrical resistance. Unlike the knitted tubular sheath, this configuration allows high currents to pass without the connector member heating excessively. In addition, the section and the density of the connector member can be adapted, depending on the magnitude of the current that it is to be passed.

In addition, the stiffness of the metal connector member ensures proper and easy positioning and retention on the end of the resistor element during draping operations of the heater mat. In spite of the pressure exerted during polymerization of the heater mat, the electrical connection does not slip. In addition, the rigid metal connector member remains sufficiently deformable to be capable of being shaped manually to match the profile of a mold when molding a heater mat to shape.

In a second aspect, the invention provides a method of manufacturing a heater mat comprising a resistor element provided with at least one connection endpiece of the invention. The top face of the plate onto which a power supply wire is to be connected electrically is covered in an anti-adhesive covering prior to polymerizing said heater mat. This covering, e.g. tape made of Teflon® (trademark in the name of the supplier DuPont de Nemours and Company), is removed after polymerization so as to enable the power supply wire to be connected to the plate.

The connection endpiece associated with the above-described manufacturing method thus allows the electrical power supply wire to be connected to the metal plate after the operations of molding the heater mat or after the mat has been bonded onto an aerodynamic surface.

When providing de-icers for rotorcraft blades, the set of elements making up the heater mat can therefore be integrated in molding of the blade, thus reducing the cost and the cycle time required for manufacturing the blade.

BRIEF DESCRIPTION OF THE DRAWINGS

The invention and its advantages appear in greater detail in the following description of embodiments given by way of illustration with reference to the accompanying figures, in which.

MORE DETAILED DESCRIPTION

Elements that are present in more than one figure are given the same reference in all of them.

Figure 1:
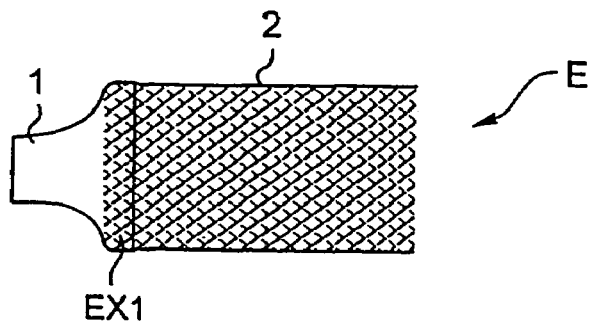
FIG. 1 is a plan view of a connection endpiece of the invention.

FIG. 1 shows a connection endpiece E of the invention for providing an electrical connection between a resistor element and an electrical power supply wire.

The endpiece E comprises a rigid metal connector member 2 of substantially flat shape arranged at a first zone EX1 of a metal plate 1.

Depending on the desired current, the connector member can be provided in four variants.

In a first variant, the connector member comprises an expanded metal element, and in a second variant it comprises a previously punched metal sheet. A third variant consists in using a metal fabric woven to constitute the connector member.

Finally, in a fourth variant, the connector member is obtained from a metal element that has been subjected to chemical machining so as to present roughnesses or crevasses in/or its face that is to come into contact with a resistor element.

Figure 2:
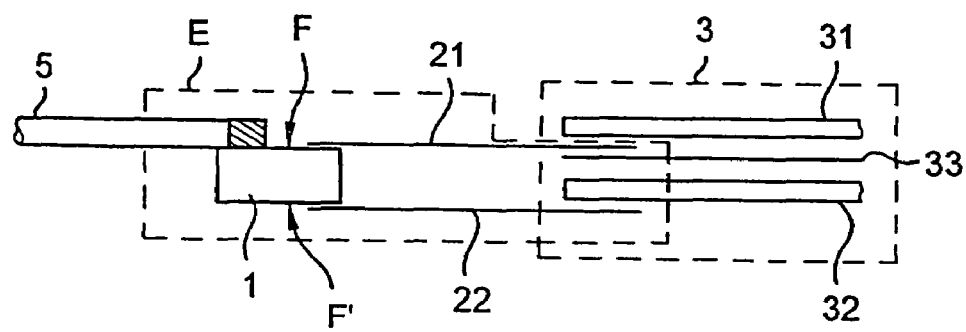
FIG. 2 is a section through a resistor element provided with a connection endpiece of the invention.

FIG. 2 is a section view through a resistor element 3 provided with a connection endpiece E.

The connection endpiece E comprises a single metal plate 1 together with two connector members 21 and 22 disposed respectively on the top and bottom faces F and F' of the metal plate 1.

In addition, a power supply wire 5 is electrically connected to the top face F of the metal plate 1, e.g. by tinplating, welding, or any other mechanical means such as crimping, riveting, screw fastening, or bonding using an electrically-conductive adhesive.

The endpiece E is placed on a multilayer resistor element 3 having two layers 31 and 32 of electrically-conductive fibers. The layers 31 and 32 are not in electrical contact with each other, being separated by a dielectric separator 33.

Under such conditions, by being in contact respectively with the layers 31 and 32 of electrically-conductive fibers, the connector members 21 and 22 enable the entire resistor element 3 to be powered electrically via the power supply wire 5.

In a variant of this embodiment, the endpiece E comprises a plurality of metal plates that are electrically in contact with one another, each plate having one or more connector members. The connector members serve to power a resistor element of the multilayer type.

The numbers of metal plates and of connector members is determined as a function of the structure of the resistor element and of the amperage that it needs to convey in order to perform its function.

Figure 3:
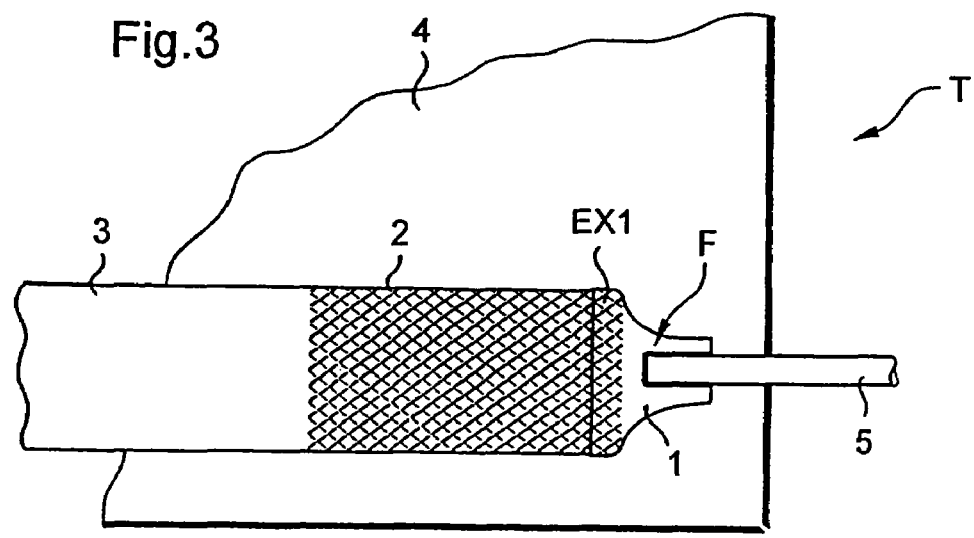
FIG. 3 is a plan view of a heater mat.

With reference to FIG. 3, a resistor element 3 provided with a connection endpiece of the invention is placed on a composite substrate 4 prior to being covered in one or more layers of pre-impregnated fiberglass fabric in order to constitute a heater mat T.

Before being covered in the layer(s) of fiberglass fabric, the top face F of the metal plate 1 to which the power supply wire 5 is to be connected is protected by an anti-adhesive covering, e.g. made of Teflon® tape. During polymerization of the heater mat, the pressure that is applied enables the roughnesses or crevasses in the connector member 2 to become engaged in the electrically-conductive fibers of the resistor element. As a result, this operation ensures good electrical contact between the connector member and the resistor element, and also good mechanical retention of the connector member in the resistor element after polymerization.

At the end of this operation, the anti-adhesive covering is withdrawn. The power supply wire 5 can then be connected to the top face F of the metal plate 1, e.g. by soldering.

If necessary, the electrical power supply wire 5 is connected to the metal plate 1 prior to polymerizing the heater mat T, or even prior to arranging the connector member 2 on the resistor element 3.

In addition, where necessary, the power supply wire 5 is also soldered onto at least a portion of the metal connector member 2.

Finally, in an embodiment that is not shown in a figure, the connector member is a bushing in which one end of the resistor element is engaged. The shape of the bushing is then substantially equivalent to the shape of the resistor element in question.

Naturally, the present invention is capable of numerous variations of implementation. Although several embodiments are described above, it will be understood that it is not conceivable to identify all possible embodiments exhaustively. Naturally, any of the means described could be replaced by equivalent means without thereby going beyond the ambit of the present invention.

What is claimed is:

1. A connection endpiece placed on a resistor element provided with at least one layer of electrically-conductive fibers, the endpiece serving to connect a power supply wire electrically to said resistor element, the endpiece comprising at least one metal plate having a top face for connection to said power supply wire, and provided with at least one rigid metal connector member of substantially flat shape arranged at a first end of said metal plate and connected to at least one layer of electrically-conductive fibers of said resistor element, said top face of said metal plate being covered in a removable anti-adhesive covering.

2. A connection endpiece according to claim 1, arranged on one end of said resistor element.

3. A connection endpiece according to claim 2, wherein said connector member is a bushing.

4. A connection endpiece according to claim 1, wherein the surface of said connector member that comes into contact with said resistor element includes roughnesses.

5. A connection endpiece according to claim 1, wherein the surface of said connector member that comes into contact with said resistor element includes crevasses.

6. A connection endpiece according to claim 1, wherein said metal plate and said connector member come from a single metal part, a first zone of said metal part constituting said connector member and a second zone being machined to constitute said metal plate.

7. A connection endpiece according to claim 1, wherein said connector member is obtained from a single metal element that has been subjected to chemical machining.

8. A connection endpiece according to claim 1, wherein said connector member is constituted by an expanded metal element.

9. A connection endpiece according to claim 1, wherein said connector member is constituted by a punched metal sheet.

10. A connection endpiece according to claim 1, wherein said connector member is constituted by a woven metal fabric.

11. A method of manufacturing a heater mat comprising a resistor element provided with at least one connector endpiece according to claim 1, wherein the top face of the plate onto which a power supply wire is to be connected electrically is covered in an anti-adhesive covering prior to polymerizing said heater mat.

12. A method according to claim 11, wherein said anti-adhesive covering is removed after said heater mat has been molded so as to enable said power supply wire to be electrically connected on said top face.

13. A method according to claim 11, wherein anti-adhesive covering is Teflon® tape.

14. A connection endpiece, comprising:
a power supply wire;
a resistor element comprised of at least one layer of electrically-conductive fibers;
a single metal plate connected to said power supply wire at a first end and terminating with an end surface at a second end; and
a single rigid metal connector member of substantially flat shape connected to an exterior face of said metal plate at the second end of said metal plate at extending away from the end surface of the metal plate,
the connector further connected to the at least one layer of electrically-conductive fibers of said resistor element, wherein,
said top face of said metal plate is covered in a removable anti-adhesive covering.

15. A connection endpiece, comprising:
a power supply wire;
a resistor element comprised of at least one layer of electrically-conductive fibers;
a metal plate connected to said power supply wire at a first end and terminating with an end surface at a second end; and
a rigid metal connector member of substantially flat shape connected to opposite exterior faces of said metal plate at the second end of said metal plate at extending away from the end surface of the metal plate,
the connector further connected to the at least one layer of electrically-conductive fibers of said resistor element, wherein,
said top face of said metal plate is covered in a removable anti-adhesive covering.

16. A connection endpiece according to claim 1, wherein,
said resistor element comprises plural layers of electrically-conductive fibers separated by a dielectric separator, and
said connector member is connected to two layers of plural layers of electrically-conductive fibers.

17. A connection endpiece according to claim 14, wherein, said resistor element comprises plural layers of electrically-conductive fibers separated by a dielectric separator, and said connector member is connected to two layers of plural layers of electrically-conductive fibers, with at least part of said connector member extending between the two layers.

18. A connection endpiece according to claim 15, wherein, said resistor element comprises plural layers of electrically-conductive fibers separated by a dielectric separator, and said connector member is connected to two layers of plural layers of electrically-conductive fibers, with at least part of said connector member extending between the two layers.

19. A connection endpiece according to claim 1, wherein said metal plate is of a first width where connected to the power supply wire and increases to a greater, second width where connected to said connector member.

20. A connection endpiece according to claim 14, wherein said metal plate is of a first width where connected to the power supply wire and increases to a greater, second width where connected to said connector member.

* * * * *